(12) United States Patent
Neary et al.

(10) Patent No.: US 9,482,744 B1
(45) Date of Patent: Nov. 1, 2016

(54) STAGGERED PULSE REPETITION FREQUENCY DOPPLER PROCESSING

(71) Applicant: Lockheed Martin Corporation, Bethesda, MD (US)

(72) Inventors: Brian P. Neary, Marcellus, NY (US); Peter H. Stockmann, Jamesville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 201 days.

(21) Appl. No.: 14/161,878

(22) Filed: Jan. 23, 2014

(51) Int. Cl.
| | |
|---|---|
| *G01S 7/28* | (2006.01) |
| *G01S 13/22* | (2006.01) |
| *G01S 13/526* | (2006.01) |
| *G01S 13/04* | (2006.01) |
| *G01S 13/18* | (2006.01) |
| *G01S 13/00* | (2006.01) |

(52) U.S. Cl.
CPC .................. *G01S 7/28* (2013.01); *G01S 13/04* (2013.01); *G01S 13/18* (2013.01); *G01S 13/225* (2013.01); *G01S 13/526* (2013.01)

(58) Field of Classification Search
CPC .......... G01S 7/28; G01S 7/282; G01S 7/285; G01S 7/288; G01S 2007/2883; G01S 2007/2886; G01S 7/292; G01S 7/2921; G01S 7/2922; G01S 7/2923; G01S 7/2927; G01S 13/02; G01S 13/04; G01S 13/06; G01S 13/08; G01S 13/10; G01S 13/12; G01S 13/50; G01S 13/52; G01S 13/522; G01S 13/524; G01S 13/53; G01S 7/2925; G01S 7/02; G01S 7/40; G01S 7/4004; G01S 7/4021; G01S 13/106; G01S 13/5244; G01S 13/526; G01S 13/58; G01S 13/62; G01S 13/64; G01S 13/18; G01S 13/22; G01S 13/225

USPC .............. 342/27, 28, 89–115, 118, 128–137, 342/159–162, 175, 194–196, 163, 192, 193
See application file for complete search history.

(56) References Cited

U.S. PATENT DOCUMENTS

| | | | | |
|---|---|---|---|---|
| 3,631,490 A | * | 12/1971 | Palmieri ............... | G01S 7/2923 342/137 |
| 3,721,978 A | * | 3/1973 | Doggett, Jr. ............ | G01S 13/53 342/101 |
| 3,745,571 A | * | 7/1973 | Chwastyk ............. | G01S 13/524 342/162 |

(Continued)

FOREIGN PATENT DOCUMENTS

| | | |
|---|---|---|
| EP | 0397527 B1 | 11/1997 |
| EP | 0851238 A2 | 7/1998 |
| WO | 9742520 A1 | 11/1997 |

OTHER PUBLICATIONS

Merrill I. Skolnik, "Introduction to Radar Systems," second edition; McGraw-Hill Book Company; New York, New York, USA; 1980; pp. 114-120.*

*Primary Examiner* — Bernarr Gregory
(74) *Attorney, Agent, or Firm* — Howard IP Law Group, P.C.

(57) ABSTRACT

A method of operating a pulse-Doppler radar system includes the steps of generating a plurality waveforms, with each waveform comprising a plurality of pulses generated with a staggered pulse repetition frequency (PRF) from pulse to pulse. Received reflected return signals from the generated plurality of waveforms are filtered by a plurality of Doppler filters that span an entire required Doppler visibility range.

20 Claims, 4 Drawing Sheets

(56) References Cited

U.S. PATENT DOCUMENTS

| | | | | |
|---|---|---|---|---|
| 3,789,396 | A * | 1/1974 | Taylor, Jr. | G01S 7/2925 342/162 |
| 3,934,253 | A * | 1/1976 | Wiedemann | G01S 13/53 342/134 |
| 4,035,799 | A * | 7/1977 | Hsiao | G01S 13/64 342/162 |
| 4,042,925 | A * | 8/1977 | Albanese | G01S 13/106 342/132 |
| 4,219,812 | A * | 8/1980 | Rittenbach | G01S 13/64 342/110 |
| 4,463,356 | A * | 7/1984 | Short, III | G01S 13/526 342/160 |
| 4,499,467 | A * | 2/1985 | Rittenbach | G01S 13/62 342/109 |
| 4,626,855 | A | 12/1986 | Rouse | |
| 4,809,002 | A | 2/1989 | Togashi et al. | |
| 4,931,800 | A | 6/1990 | Ward | |
| 4,975,706 | A | 12/1990 | Shrader | |
| 5,247,303 | A | 9/1993 | Cornelius et al. | |
| 5,539,412 | A * | 7/1996 | Mendelson | G01S 13/5244 342/192 |
| 6,229,475 | B1 * | 5/2001 | Woolley | G01S 13/53 342/159 |
| 6,819,285 | B1 * | 11/2004 | Stockman | G01S 7/4021 342/133 |
| 7,741,992 | B2 | 6/2010 | Wang et al. | |
| 7,952,515 | B2 | 5/2011 | McEwan | |
| 8,305,256 | B1 | 11/2012 | Manickam et al. | |
| 2003/0117314 | A1 | 6/2003 | Yu | |

* cited by examiner

STAGGERED PULSE REPETITION FREQUENCY DOPPLER PROCESSING

FIELD OF THE INVENTION

The present invention relates to signal processing systems and methods for use in radar applications, and more particularly, to signal processing systems and methods utilizing staggered pulse repetition frequency (PRF) waveforms in a pulse-Doppler radar system.

BACKGROUND

Radar systems are useful for detecting, characterizing and monitoring various kinematic parameters associated with natural and/or man-made objects and are critical to both civilian and military operations. These systems typically transmit "beams" or electromagnetic (EM) signals intended to engage one or more objects or targets, and process reflected return signals (or echoes) for object identification and characterization. A radar echo return usually contains both signals generated from a target, as well as background clutter. The clutter signal arises from reflections from stationary and slow-moving background objects (e.g. precipitation, terrain, etc.), and is usually stronger than the target signal. This clutter decreases radar performance by hindering the system's ability to detect targets and/or increases the probability of a false target detection.

Numerous methods exist which attempt to discriminate between unwanted clutter and target return signals. Many of these clutter cancellation methods rely on the principle that moving targets have a Doppler frequency shift, while stationary targets do not. Thus, pulse-Doppler radar systems may implement a plurality of Doppler frequency filters (e.g. FFT networks) used to divide the Doppler frequency space into many narrow regions, with each filter corresponding to one of these frequency bands. Knowing the frequency space normally associated with specific clutter types, these Doppler filters can be used to discriminate against clutter, as well as identify target Doppler frequency.

As radar sensitivity increases, previously undetectable wideband discrete clutter returns can cause high false alarm rates. In order to improve detectability, as well as improve the rejection of this clutter, fixed PRF, multi-pulse Doppler waveforms are typically used. As will be understood by one of ordinary skill in the art, due to the bandwidth of the clutter, fixed PRF Doppler waveforms with adequate Doppler visibility are often range ambiguous. Thus, in order to cover range and Doppler blinds inherent in this type of fixed PRF processing, as well as obtain detection that provides accurate range and angle information, transmitted beams must consist of multiple, unique high fixed PRF waveforms. Moreover, target hits must occur on more than one of these pulses in order to obtain accurate range data.

There are several additional problems with this waveform approach. First, the sensitivity of the system is impacted due to the coherent processing interval (CPI) being shortened to provide for multiple PRFs. The sensitivity is also impacted due to multiple hits being required to provide accurate range in the range ambiguous CPIs resulting from the high PRF. Further, due to small targets folding into short ranges and competing with large clutter, predetermined system clutter stability requirements are often difficult to achieve. Finally, processing ambiguous targets precludes the use of more sensitive Swerling (e.g. SW2/SW4) detection processing techniques.

Accordingly, improved methods of processing return signals in a pulse-Doppler radar system are desired.

SUMMARY

In one embodiment of the present disclosure, a pulse-Doppler radar system is provided. The system includes a transmitter configured to generate and transmit a waveform comprising a plurality of pulses generated with a staggered pulse repetition frequency from pulse to pulse. A receiver is configured to receive reflected radar return signals and convert the received signals into complex digital data. A plurality of Doppler filters spanning an entire desired (target) Doppler visibility range are provided for filtering the received digital data into complex digital output data. The system further includes at least one processor configured to perform target detection on objects of interest based on the outputs of the Doppler filters. This target detection may be based on the power of the complex digital output by summing the squares of the real and imaginary components of the complex digital output data at each range/Doppler call.

In another embodiment of the present disclosure, a method of operating a pulse-Doppler radar system is provided. The method includes the steps of generating a waveform comprising a plurality of pulses generated with a staggered pulse repetition frequency from pulse to pulse, and receiving reflected return signals from the generated waveform. The received return signals are Doppler filtered via a plurality of Doppler filters spanning an entire required Doppler visibility range to generate complex digital output data. Target detection may be performed based on the power of the complex digital output data by summing the squares of the real and imaginary components of the complex digital output data at each range/Doppler cell.

DETAILED DESCRIPTION

Figure 1:
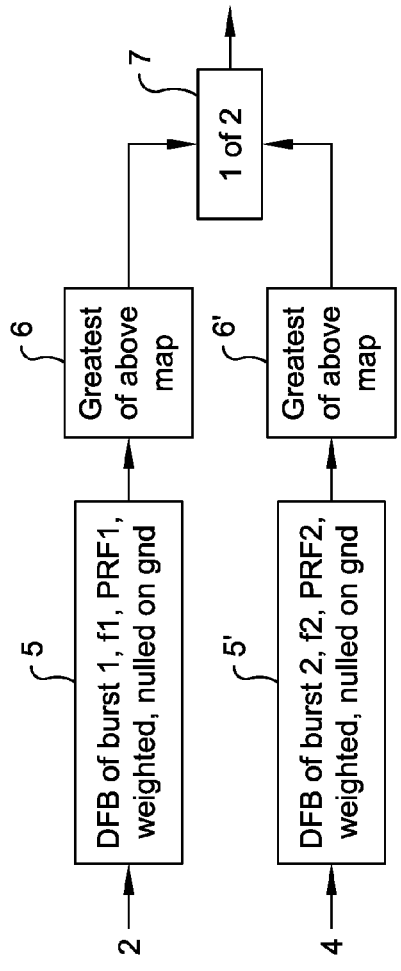
FIG. 1 is a simplified process diagram illustrating the operation of a radar system according to the prior art.

It is to be understood that the figures and descriptions of the present invention have been simplified to illustrate elements that are relevant for a clear understanding of the present invention, while eliminating, for purposes of clarity, many other elements found in radar systems, including pulse-Doppler radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure include waveform design and processing approaches for avoiding the above-described drawbacks of the prior art. Specifically, embodiments include pulse-Doppler radar systems that utilize waveforms with a pulse-to-pulse, intra-CPI, PRF stagger for minimizing Doppler blinds. The waveforms are low PRF (LPRF), yielding unambiguous range data with only a single target hit. As will be understood by one of ordinary skill in the art, LPRF waveforms cover the entire instrumented range of the radar. For example, for a 200 kilometer (Km) instrumented range, a typical LPRF waveform may be 220 Km. The additional 20 Km in the pulse repetition interval (PRI) is used to minimize pulse eclipsing at the far end of the PRI. In distinction, a high PRF (HPRF) waveform covers the entire required Doppler of the target. For example, for an L-Band radar with a required Doppler visibility of +/−1000 meters/sec, the maximum PRI for a high PRF waveform may be approximately 18.5 Km. Higher RF frequencies and larger Doppler visibility requirements would shorten this PRI.

Doppler filters according to embodiments of the present disclosure are designed to cover the entire required Doppler visibility range for the application. Moreover, the Doppler filters may be designed at specific Rdots (object-to-target range rate, meters/second), allowing for true non-coherent Swerling integration across CPIs. More specifically, each of these multiple (e.g. one thousand) filters are designed to reject stationary and wideband clutter while passing a specific Rdot. Unique filters are designed at each Rdot for each unique set of staggers and each transmitter RF frequency. Applying these filters to a series of time domain radar return signals results in a Range/Rdot matrix of powers that can be summed element by element to yield true SW2 detection probabilities.

Prior implementations of staggered PRF waveforms utilized moving target indication (MTI) processing. This staggered PRF, MTI filtering covers the entire Doppler visibility requirement, but uses only a single Doppler filter in conjunction with three to five pulses per waveform. The shortcoming of staggered PRF, MTI processing with respect to embodiments of the present disclosure is that these processes do not maximize coherent gain across the band, and thus do not maximize detectability.

Moreover, the proposed approach has two advantages relative to the above-described fixed PRF waveforms with inter-CPI stagger methods. First, in the fixed PRF approach, Doppler filters can only be implemented between zero and the PRF. The PRF is typically a fraction of the required Doppler visibility of the system for a LPRF waveform. Also, the inter-CPI stagger causes targets to fold into the ambiguous range/Doppler space of each CPI in an unpredictable way. Advantageous SW2 processing requires the non-coherent addition of range/Doppler cell for CPIs with different RF frequencies. The unpredictable manner that targets fold in the fixed PRF approach precludes taking advantage of the SW2 detection probabilities.

The system and method of the present disclosure allows filters to be designed at specific Rdots across the entire Doppler uncertainty region. Even for different RF frequencies, the output of the proposed approach yields two range/Doppler matrices where each element of one matrix has a matching range/Doppler point in the other matrix. Taking the magnitude squared of each of these matrices and performing an element by element addition provides SW2 detection capability with its commensurate increase in sensitivity.

This arrangement also lowers the clutter stability requirement by orders of magnitude and simplifies the detection processing software. Clutter stability is a quantitative indication of the ability of a system to reject clutter. If a given range bin has a clutter to noise ratio (CNR) of 80 dB and a clutter stability of 50 dB, there will be a noise floor due to clutter that is 30 dB above the thermal noise floor in Doppler bins that are separated from clutter. The proposed approach utilizes staggered LPRF waveforms, wherein a target only competes against clutter from its own range. For LPRF waveforms, the ranges where the CNR is high correspond to ranges where the signal to noise ratio (SNR) is also likely to be high. The target can often be detected even with an elevated noise floor due to a lowered clutter stability requirement. In contrast, HPRF and MPRF waveforms have very high clutter stability requirements. This is because targets from long ranges fold into shorter ranges where they must be detected in range cells with high clutter. The range loss on the target for these PRFs is often orders of magnitude larger than the range loss on the clutter.

FIG. 1 is a high-level illustration of a coherent radar return signal processing method according to the prior art. A radar system is configured to output two signal bursts, each burst comprising a waveform including a plurality of signal pulses transmitted at a fixed PRF. Reflected return signals 2,4 from each transmitted signal burst are received by the radar system, filtered by a Doppler filter bank comprising Doppler filters which span from zero to the PRF, and are otherwise processed for clutter reduction according to known techniques in blocks 5,5'. In blocks 6,6', for each received return signal, a "greatest of" operation may be performed across each of the filters of the Doppler filter bank in order to identify which particular Doppler filter comprises the greatest return above its respective clutter map (i.e. identify the filter comprising the greatest signal/clutter map ratio). Finally, a one-of-two process, which includes declaring a detection if a range/Doppler cell exceeds a detection threshold in either PRF, is performed in block 7.

Figure 2:
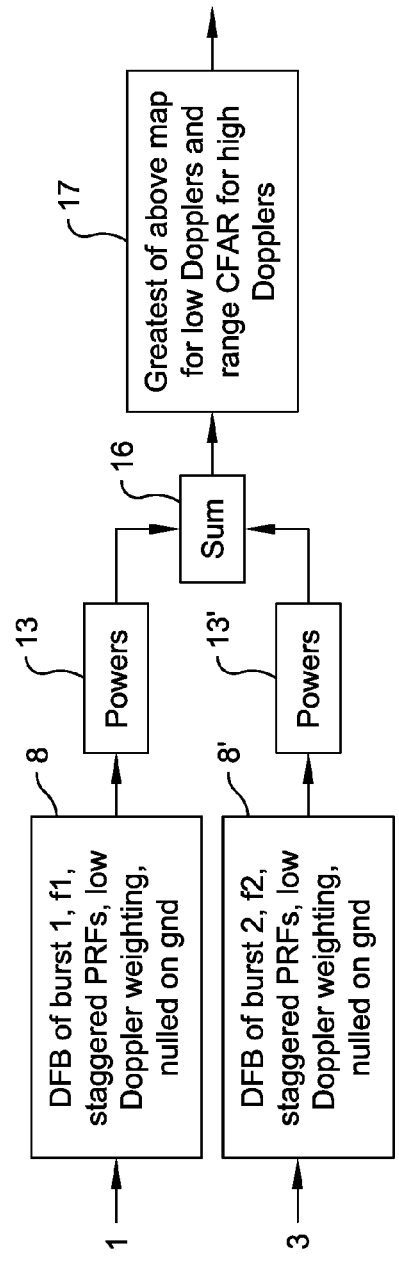
FIG. 2 is a simplified process diagram illustrating the operation of a radar system according to an embodiment of the present disclosure.

FIG. 2 is a high-level illustration of a coherent radar return signal processing method according to an embodiment of the present disclosure. A radar system is configured to output two signal bursts, with each burst comprising a waveform including a plurality of signal pulses transmitted at a staggered PRF. Reflected return signals 1,3 from each transmitted signal burst are received by the radar system. In blocks 8,8', received return signals 1,3 from each burst are Doppler filtered using a bank comprising filters which span an entire desired Doppler visibility range or predetermined target Rdot window (e.g. from +/− the speed of sound, or +/−Mach 1). When Doppler filters span the entire visibility using staggered LPRF waveforms, the result is a range/Doppler matrix of magnitudes that have no range or Doppler blinds (i.e. regions where a target cannot be detected).

Moreover, this technique allows a Doppler notch to be designed at frequencies where wideband clutter exists without causing a significant adverse impact on Doppler visibility.

Doppler filter outputs from return signals 1,3 are provided to processing blocks 13,13', wherein the sum of the squares of the real and imaginary components of the signal at each range/Doppler cell are calculated. The resulting outputs of blocks 13,13' are combined or summed in processing block 16 prior to a threshold detection operation in block 17. Detection processing may include, for example, a constant false alarm rate (CFAR) target detection process. As will be understood by one of ordinary skill in the art, CFAR processing attempts to determine a threshold power above which any return can be considered to originate from a target. This threshold is set typically to achieve a desired probability of a false alarm, or false alarm rate.

Figure 3:
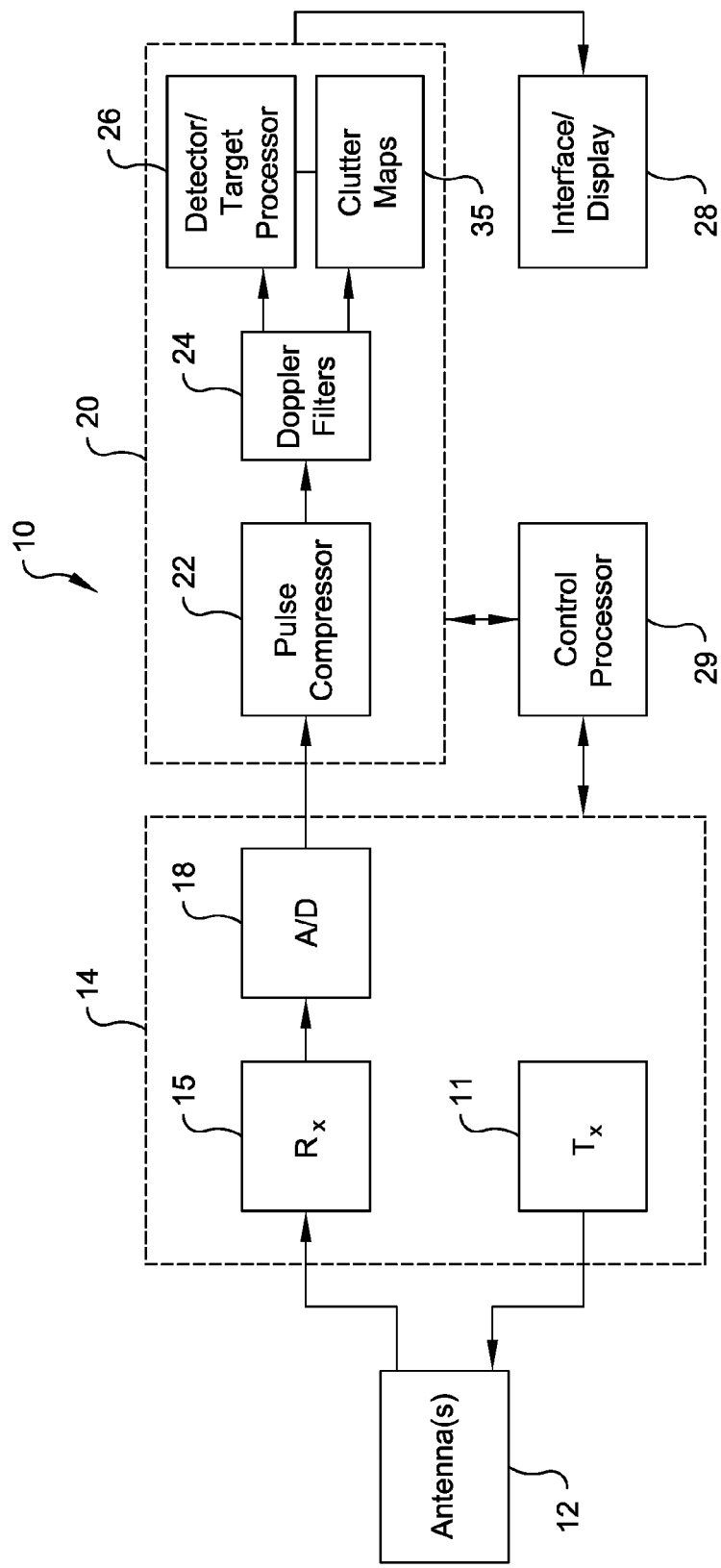
FIG. 3 is a simplified schematic diagram of a radar system useful for describing embodiments of the present disclosure.

Referring generally to FIG. 3, embodiments of the present disclosure will be further described herein as implemented into an exemplary pulse-Doppler radar system. As will be understood by one of ordinary skill in the art, a pulse-Doppler system 10 may comprise a front-end module 14, including a transmitter 11 responsive to a control processor 29 for generating and transmitting a series of defined waveforms from an antenna 12. As set forth above, these waveforms may take the form of EM signal bursts comprising a plurality of staggered low PRF pulses. Reflected return signals from each burst are subsequently captured by antenna 12 and provided to at least one receiver 15 for signal modulation. Receiver 15 may include various processing components, such as one or more filters, a low-noise amplifier and a down converter, as will be understood by one of ordinary skill in the art. At least one analog to digital converter (ADC) 18 is provided for converting received analog return signals to digital form.

System 10 may also include, by way of non-limiting example, a digital processing system 20, including a pulse compression module 22 operative to receive post-A/D digitized in-phase and quadrature-phase (I/Q) signal data from front end module 14. As will be understood by one of ordinary skill in the art, pulse compression techniques may be implemented to achieve high range resolution without the need for high-powered antennas. Pulse compression may be accomplished by various filtering and/or line delay arrangements. For example, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain.

The output of pulse compression module 22 comprises modulated data which may be subject to further processing, such as sampling the incoming data into range cells or bins, and generating one sample in each range bin for each pulse. Range bin data is provided to Doppler filters 24 which generate a series of Doppler bins for each range cell. As described above, Doppler filters 24 comprises a plurality of Doppler filters spanning the entire desired visible range, for example, from +/− the speed of sound, and may also be designed to target specific Rdots to enable the use of SW2 detection probabilities. Data from a particular Doppler bin corresponds to a signal from a target or background, at a given range, moving at a particular speed. Once Doppler-filtered, return data is provided to a detection processor 26 operative to, for example, perform a target detection process against a time-averaged background map 35. These detection processes may include one of more of "greatest of" operations, as well as CFAR detection techniques. The results of this detection processing may be provided to a display device 28 for end-user interfacing.

In one embodiment, the powers of the complex digital output data at each range/Doppler cell from two or more bursts are summed by detection processor 26 prior to target detection, wherein each burst is at a different transmitter frequency to enhance Swerling II detection performance. Detection processor 26 may be further configured to perform constant false alarm rate processing by comparing the combined powers of each range/Doppler cell to a background clutter map (e.g. clutter maps 35), yielding Swerling II detection statistics. In another embodiment, detection processor 26 may be configured to perform constant false alarm rate processing by comparing the powers of each range/Doppler cell to a background clutter map (e.g. clutter maps 35), yielding Swerling I detection statistics.

Figure 4:
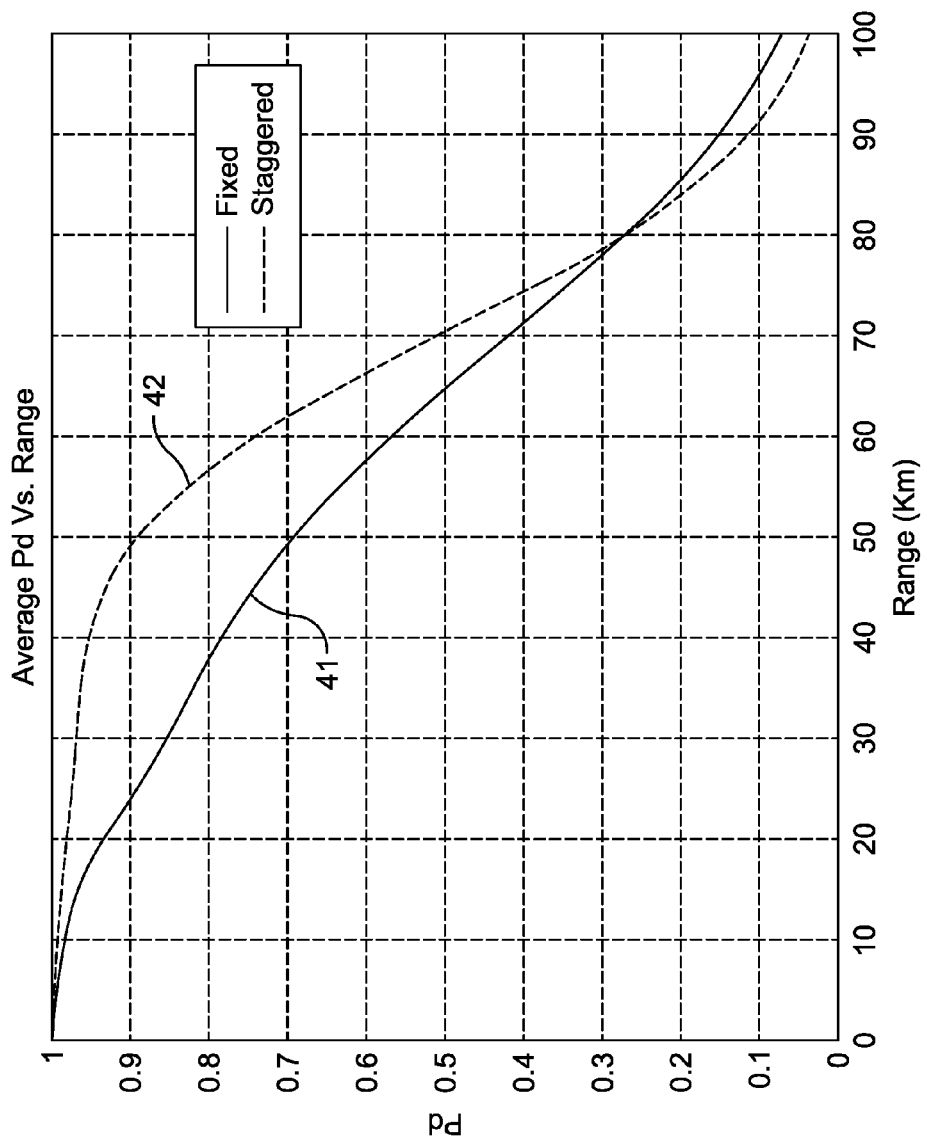
FIG. 4 is a graph illustrating the benefits of embodiments of the present disclosure.

Referring generally to FIG. 4, a performance comparison of the systems of FIGS. 1 and 2 is shown. The baseline approach of FIG. 1 includes the use of two fixed PRF waveforms (e.g. 1175 Hz and 1058 Hz, respectively), with ten (10) pulses in each burst. Using "one-of-two" processing, with twenty Doppler bins spanning the PRFs. The resulting probability of detection (Pd) vs. range is shown as trace 41.

Still referring to FIG. 4, trace 42 represents the performance of an embodiment of the present disclosure, as described above with respect to FIGS. 2 and 3. More specifically, using two staggered PRF waveforms, each range/Doppler bin is summed across the coherent pulse intervals. Using SW2, N=2 detection processing, at a Pd equal to 0.8, the staggered PRF waveform approach according to embodiments of the present disclosure yields a 7.1 dB improvement (i.e. 37.53 Km vs. 56.36 Km).

Figure 5:
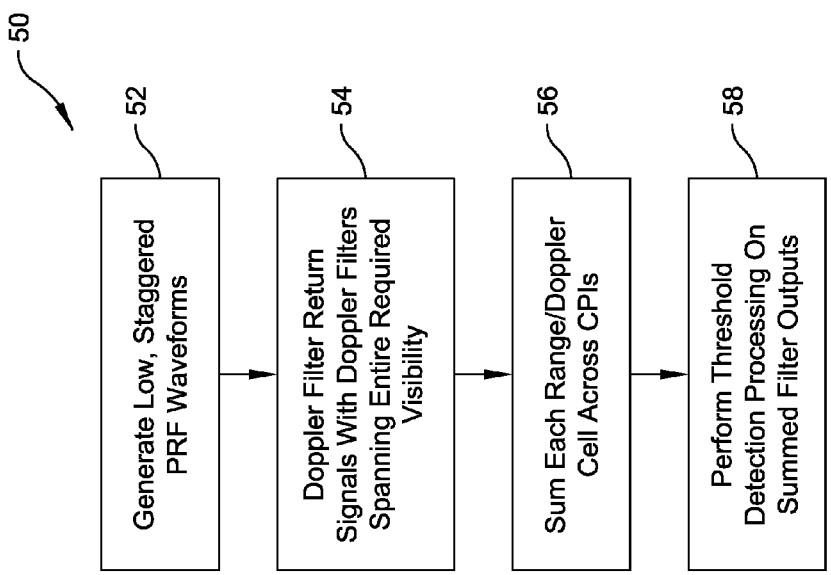
FIG. 5 is a process flow diagram illustrating an exemplary radar processing method according to an embodiment of the present disclosure.

FIG. 5 is a process flow diagram illustrating an exemplary signal processing method 50 according to the present disclosure. As set forth above, embodiments of the present disclosure include generating and transmitting staggered low PRF waveforms in step 52. In step 54, received reflected return signals are filtered through a Doppler filter bank comprising filters spanning an entire desired Doppler visibility range. The outputs of each range/Doppler cell are summed across the CPIs in step 56, and target detection processing is performed on the resulting combined outputs (step 58). Detection processing may include a combination of "greatest of" and CFAR techniques.

The staggered PRF Doppler processing described herein supports improved Doppler filter visibility with wide clutter notches in LPRF waveforms and low false alarm rates due to low radar cross-section (RCS) wideband clutter. The proposed processing eliminates detection on wideband clutter by filtering the clutter with a notch. Given the staggered PRFs, these notches do not repeat at PRF lines like they would for fixed PRF waveforms, yielding improved Doppler visibility. Embodiments greatly reduce clutter stability requirements relative to medium PRF waveform approaches with HPRF and MPRF waveforms, wherein low RCS targets from long range can fold into shorter ranges where they must compete with high RCS short range clutter. Under these circumstances the clutter stability of the system must be high enough to offset both the RCS and range differences between the target and clutter.

As an example of the implementation of the invention, consider a two burst beam with a total beam time of 17.6 msec, covering a Doppler span of +/−Mach 1 (+/−333 m/sec). Each of the two bursts would be 8.8 msec in duration, and be at a different carrier frequency for Swerling RCS diversity. Each burst would have 6 pulses with 6 different CPI staggers across the burst. For the customary, prior art approach, each burst would have 6*2=12 Doppler filters covering the ambiguous space between 0 and 78.68 m/sec (the Doppler window) assuming a 2:1 oversampling of the Doppler space and an RF frequency of 1300 MHz. Each individual Doppler filter in this case would have a resolution bandwidth of about 13 m/sec. There are 9 velocity blinds that need to be eliminated using the CPI to CPI stagger of the invention. The Doppler filters for the invention would be positioned at specific Rdots, with the coefficients tuned to the RF frequencies, so that the Doppler bins can be summed from the two bursts. The specific Rdots must be chosen to meet the required Doppler scalloping loss for the shortest duration CPI that is going to be included in the non-coherent integration. If the minimum CPI were as specified above, and the Doppler scalloping loss required the filters to be over-packed by 2:1, the spacing would be one-half of the 13 m/sec resolution bandwidth, or 6.5 m/sec. The +/−Doppler spacing would result in 2*333/6.5=103 uniquely designed Doppler filters for the invention. The Doppler filters are unique in the sense that they are designed to pass a given frequency while rejecting narrowband and wideband clutter. The 103 Doppler filters per burst for the invention is to be compared with 12 Doppler filters per burst for the prior art approach.

The embodiments are provided by way of example only, and other embodiments for implementing the methods described herein may be contemplated by one of skill in the pertinent art without departing from the intended scope of this disclosure. For example, processing systems described herein may include memory containing data, which may include instructions, the instructions when executed by a processor or multiple processors, cause the steps of a method for performing the operations set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various additional modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A pulse-Doppler radar system, comprising:
   a transmitter configured to generate and transmit a waveform comprising a plurality of pulses generated with a staggered pulse repetition frequency from pulse to pulse;
   a receiver configured to receive reflected radar signals and convert the received radar signals to complex digital received data;
   a plurality of Doppler filters spanning an entire required Doppler visibility range and configured to filter the complex digital received data into complex digital output data; and
   a processor configured to perform target detection of objects of interest based on the power of the complex digital output data by summing the squares of the real and imaginary components of the complex digital output data at each range/Doppler cell,
   wherein the plurality of Doppler filters span at least a range defined between:
      a predetermined object to range rate (Rdot) of the system, and
      (−1)×(the predetermined Rdot).

2. The system of claim 1, wherein the powers of the complex digital output data at each range/Doppler cell from two or more bursts are summed prior to target detection, wherein each burst is at a different transmitter frequency to enhance Swerling II detection performance.

3. The system of claim 2, wherein the processor is further configured to perform constant false alarm rate processing by comparing the combined powers of each range/Doppler cell to a background clutter map, yielding Swerling II detection statistics.

4. The system of claim 1, wherein the processor is further configured to perform constant false alarm rate processing by comparing the powers of each range/Doppler cell to a background clutter map, yielding Swerling I detection statistics.

5. A pulse-Doppler radar system, comprising:
   a transmitter configured to generate and transmit a waveform comprising a plurality of pulses generated with a staggered pulse repetition frequency from pulse to pulse;
   a receiver configured to receive reflected radar signals and convert the received radar signals to complex digital received data;
   a plurality of Doppler filters spanning an entire required Doppler visibility range and configured to filter the complex digital received data into complex digital output data; and
   a processor configured to perform target detection of objects of interest based on the power of the complex digital output data by summing the squares of the real and imaginary components of the complex digital output data at each range/Doppler cell, wherein the plurality of Doppler filters are each configured at a specific object to range rate (Rdot) across the entire required Doppler range to reject stationary and wideband clutter while passing the specific Rdot.

6. The system of claim 5, wherein the plurality of Doppler filter are further configured to reject stationary and wideband clutter while passing the specific Rdot for each unique set of pulse repetition frequency staggers and each transmitter frequency.

7. The system of claim 5, wherein the plurality of Doppler filters span at least a range defined between:
   a predetermined Rdot of the system, and
   (−1)×(the predetermined Rdot).

8. The system of claim 5, wherein the powers of the complex digital output data at each range/Doppler cell from two or more bursts are summed prior to target detection, wherein each burst is at a different transmitter frequency to enhance Swerling II detection performance.

9. The system of claim 8, wherein the processor is further configured to perform constant false alarm rate processing by comparing the combined powers of each range/Doppler cell to a background clutter map, yielding Swerling II detection statistics.

10. The system of claim 5, wherein the processor is further configured to perform constant false alarm rate processing by comparing the powers of each range/Doppler cell to a background clutter map, yielding Swerling I detection statistics.

11. A method of operating a pulse-Doppler radar system, the method comprising the steps of:
   generating a waveform comprising a plurality of pulses generated with a staggered pulse repetition frequency (PRF) from pulse to pulse;
   receiving reflected return signals from the generated waveform;
   Doppler filtering the received return signals by a plurality of Doppler filters spanning an entire required Doppler visibility range to generate complex digital output data; and
   performing target detection of objects of interest based on the power of the complex digital output data by summing the squares of the real and imaginary components of the complex digital output data at each range/Doppler cell,
   wherein the plurality of Doppler filters span at least a range defined between:
      a predetermined object to range rate (Rdot) of the system, and
      (−1)×(the predetermined Rdot).

12. The method of claim 11, further comprising the step of summing the powers of the complex digital output data at each range/Doppler cell from two or more bursts prior to target detection, wherein each burst is at a different transmitter frequency to enhance Swerling II detection performance.

13. The method of claim 12, wherein the step of performing target detection of objects of interest comprises performing constant false alarm rate processing by comparing the combined powers of each range/Doppler cell to a background clutter map, yielding Swerling II detection statistics.

14. The method of claim 11, wherein the step of performing target detection of objects of interest comprises performing constant false alarm rate processing by comparing the powers of each range/Doppler cell to a background clutter map, yielding Swerling I detection statistics.

15. A method of operating a pulse-Doppler radar system, the method comprising the steps of:
   generating a waveform comprising a plurality of pulses generated with a staggered pulse repetition frequency (PRF) from pulse to pulse;
   receiving reflected return signals from the generated waveform;
   Doppler filtering the received return signals by a plurality of Doppler filters spanning an entire required Doppler visibility range to generate complex digital output data; and
   performing target detection of objects of interest based on the power of the complex digital output data by summing the squares of the real and imaginary components of the complex digital output data at each range/Doppler cell,
   wherein the step of Doppler filtering the received return signals comprises filtering using Doppler filters each configured at specific object to range rates (Rdots) across the entire required Doppler range.

16. The method of claim 15, wherein the plurality of Doppler filter are further configured to reject stationary and wideband clutter while passing the specific Rdot for each unique set of pulse repetition frequency staggers and each transmitter frequency.

17. The method of claim 15, wherein the plurality of Doppler filters span at least a range defined between:
   a predetermined Rdot of the system, and
   (−1)×(the predetermined Rdot).

18. The method of claim 15, further comprising the step of summing the powers of the complex digital output data at each range/Doppler cell from two or more bursts prior to target detection, wherein each burst is at a different transmitter frequency to enhance Swerling II detection performance.

19. The method of claim 18, wherein the step of performing target detection of objects of interest comprises performing constant false alarm rate processing by comparing the combined powers of each range/Doppler cell to a background clutter map, yielding Swerling II detection statistics.

20. The method of claim 15, wherein the step of performing target detection of objects of interest comprises performing constant false alarm rate processing by comparing the powers of each range/Doppler cell to a background clutter map, yielding Swerling I detection statistics.

* * * * *